United States Patent [19]
Davies et al.

[11] Patent Number: 5,772,756
[45] Date of Patent: Jun. 30, 1998

[54] DIAMOND SYNTHESIS

[76] Inventors: Geoffrey John Davies, 36 Boundary Road, Linden Extension, Randburg; Aulette Stewart, 22 Nicolyn Avenue, Ruiterhof, Randburg; Bronwyn Annette Roberts, 94 18th Street, Parkhurst, Johannesburg, all of South Africa

[21] Appl. No.: 770,685

[22] Filed: Dec. 19, 1996

[30] Foreign Application Priority Data

Dec. 21, 1995 [ZA] South Africa .......................... 95/10898
Feb. 1, 1996 [ZA] South Africa ............................ 96/0782

[51] Int. Cl.[6] .................................................. C30B 29/04
[52] U.S. Cl. ............................... 117/79; 117/929; 423/446
[58] Field of Search ....................... 117/79, 929; 423/446

[56] References Cited

U.S. PATENT DOCUMENTS 3,297,407  1/1967  Wentorf, Jr. .
4,034,066  7/1977  Strong et al. .
4,073,380  2/1978  Strong et al. .
4,287,168  9/1981  Wentorf, Jr. et al. .
4,301,134  11/1981 Strong .
4,322,396  3/1982  Strong .
4,340,576  7/1982  Strong .
4,425,315  1/1984  Tsuji et al. ............................... 423/446
4,485,080  11/1984 Shingu et al. ........................... 423/446
4,632,817  12/1986 Yazu et al. ............................... 117/929

*Primary Examiner*—Robert Kunemund
*Attorney, Agent, or Firm*—Oblon, Spivak, McClelland, Maier & Neustadt, P.C.

[57] ABSTRACT

A method of producing diamond crystal growth on a seed crystal is provided. The method includes the steps of providing a seed crystal containing at least one twin plane and re-entrant growth surfaces associated therewith and applying high temperature/high pressure synthesis conditions to the seed crystal to cause diamond growth to occur preferentially on the re-entrant surfaces. The diamond growth on the seed crystal results in a diamond crystal being produced which has an aspect ratio greater than 1.

16 Claims, 1 Drawing Sheet

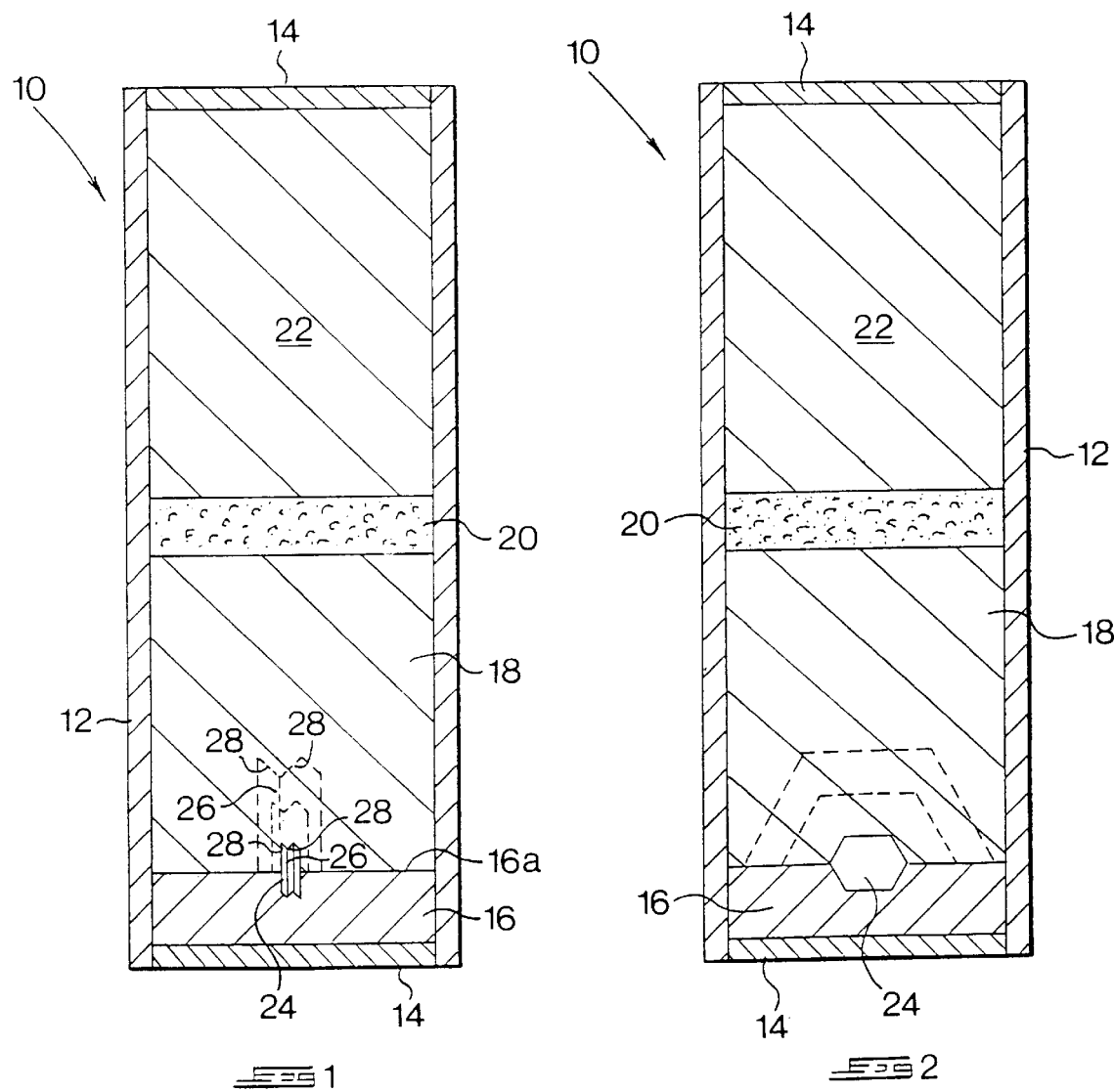

DIAMOND SYNTHESIS

BACKGROUND OF THE INVENTION

This invention relates to the synthesis of diamond crystals.

The synthesis of diamonds using high pressure/high temperature technology has become very well established commercially. This process involves exposing a carbon source to temperatures and pressures in the region of diamond thermodynamic stability of the carbon phase diagram in the presence of a suitable catalyst/solvent. Catalysts/solvents useful in diamond synthesis are well known and include metals of Group VIII of the Periodic Table.

While many commercial processes for synthesising diamond produce small, or relatively small, particles, there are processes known for producing much larger diamonds. These processes generally involve producing the diamond in a reaction vessel in which diamond seed material is separated from a source of carbon, preferably substantially pure carbon, by a mass of metallic catalyst/solvent such that during synthesis a predetermined temperature gradient between the diamond seed material and the source of carbon is created. The diamond seed material is at a point at which the temperature of the reaction medium will be near the minimum value whilst the source of carbon is placed at a point where the temperature will be near its maximum. By way of illustration, reference in this regard may be made to the disclosures of U.S. Pat. Nos. 4,340,576, 4,073,380, 4,034,066, 4,301,134, 3,297,407, 4,322,396 and 4,287,168.

Diamonds produced by the synthesis methods described above are predominantly single crystals with only a very small proportion of twinned crystals being produced. Twinned crystals are those which have a twin plane extending through at least a part of the crystal. Some twinned crystals have re-entrant surfaces where the twin plane emerges from the crystal.

SUMMARY OF THE INVENTION

According to the present invention, a method of producing diamond crystal growth on a seed crystal includes the steps of providing a seed crystal containing at least one twin plane and re-entrant growth surfaces associated therewith and applying high temperature/high pressure synthesis conditions to the seed crystal to cause diamond growth to occur preferentially on the re-entrant surfaces.

The invention has particular application to the growth of diamond on seed crystals, particularly diamond seed crystals, preferably containing two or more twin planes. Preferential diamond growth on the re-entrant surfaces of seed crystals results in the production of a diamond crystal having a high aspect ratio, i.e. a ratio length to breadth (width) of greater than, and generally significantly greater than, 1. Such crystals will typically have a plate, tabular, columnar or needle shape.

In one preferred form of the invention, a method of producing one or more diamonds, each having an aspect ratio greater than 1, includes the steps of:

providing one or more twinned diamond seed crystals, containing at least one twin plane and re-entrant growth surfaces associated therewith;

placing the seed crystals on a pad in a reaction capsule such that the re-entrant surfaces are in contact with a mass of metallic catalyst/solvent which separates the seed crystals from a carbon source;

placing the reaction capsule in the reaction zone of a high temperature/high pressure apparatus;

subjecting the contents of the reaction capsule to conditions of temperature and pressure in the region of diamond thermodynamic stability of the carbon phase diagram such that a temperature gradient is created between the seed crystals and the carbon source with the seed crystals being located at a point near the minimum value of temperature for. the temperature gradient and the carbon source being located at a point near the maximum value of temperature for the temperature gradient; and maintaining these conditions for a time sufficient to produce diamond growth on the seed crystals, such diamond growth occurring preferentially on the re-entrant surfaces.

BRIEF DESCRIPTION OF THE DRAWINGS

FIGS. 1 and 2 are sectional views, side and front respectively, of a loaded reaction capsule for use in an embodiment of the invention.

DESCRIPTION OF EMBODIMENTS

The invention allows for the growth of diamond crystals which have an aspect ratio of greater than, and generally significantly greater than, 1. The shape of the crystals will thus typically be plate, tabular, columnar or needle-like. This is achieved by providing seed crystals which are twinned and preferably orienting the seed crystals such that the dominant growth on the re-entrant surfaces can occur. The seed crystals may have two or more twin planes with associated re-entrant surfaces on which growth preferentially takes place. When there are two or more twin planes they are preferably coherently twinned. A coherent twin occurs when the lattice points on either side of the twin boundary are related by some crystallographic symmetry operation, e.g. mirroring or rotation.

The high temperature/high pressure conditions for producing diamond growth on a diamond seed crystals will preferably be those known in the art for producing large diamond crystal growth such as those described in the United States specifications mentioned above. A plurality of twinned diamond seed crystals may be placed on the seed pad where each diamond seed crystal presents at least one set of re-entrant surfaces to the diamond growth region of such a capsule. The seed crystals are preferably placed on the seed pad such that the twin plane or planes are perpendicular, or substantially perpendicular, to the pad or surface of the pad in which or on which they are located. Other orientations are possible, provided the reentrant surfaces are exposed to the growth region of the capsule.

The growth of diamond will occur in the presence of a metallic catalyst/solvent. Such metallic catalyst/solvents are known in the art and are described in the United States patent specifications mentioned above. The metallic catalyst solvent will preferably be a suitable Group VIII metal such as iron, nickel or cobalt or an alloy thereof. Particularly suitable alloys have been found to be iron/nickel alloys and iron/cobalt alloys.

The conditions of elevated pressure and temperature necessary for diamond growth are also well known in the art. Typically the pressures used will be 50 to 70 kilobars and the temperatures used will be 1350° to 1600° C.

Diamonds having aspect ratio significantly greater than 1 can be produced in high yield by the method of the invention. Generally, a plurality of discrete, twinned diamond seed crystals will be placed on a pad in a reaction capsule.

The diamond seeds will be spaced from each other to allow controlled diamond growth to occur on each seed crystal. It has been found that it is possible to produce a high yield of diamonds having aspect ratios of 2:1 to 10:1. Yields of 50 percent or more of such diamonds are achievable.

The diamond synthesis conditions of temperature and pressure will be maintained for a time sufficient to produce the size of crystal desired. The elevated conditions of temperature and pressure will typically be maintained for a period of at least the order of hours.

An embodiment of the invention will now be described with reference to the accompanying drawing. Referring to the drawings, a reaction capsule 10 has sides 12 and end caps 14. A seed pad 16 made of a material such as pyrophyllite is placed on the lower end cap 14. The capsule contains a first mass of metallic catalyst/solvent 18 in contact with the seed pad and carbon source 20. The carbon source will typically be a layer of particulate graphite. A second mass of metallic catalyst/solvent 22 is provided above the carbon source 20.

A plurality of diamond seeds 24 are located in the seed pad 16. To locate the seeds 24 positively, some penetration of the seeds into the pad, as illustrated, will occur. Each of these seeds is a twinned diamond crystal having at least one twin plane 26, preferably two or more, extending through the crystal and presenting re-entrant surfaces 28 where the twin plane or planes emerge from the crystal (see FIG. 1).

The reaction capsule is placed in the reaction zone of a high temperature/high pressure apparatus and the contents of the capsule are exposed to diamond synthesis conditions of temperature and pressure. The diamond synthesis conditions are such that a temperature gradient is created in the capsule such that the carbon source 20 is at a temperature near the maximum value of the temperature gradient and the seed crystals 24 are at a temperature near the minimum value of the temperature gradient. The manner in which this is achieved is well known in the art. Carbon from the carbon source dissolves in the metallic catalyst/solvent, migrates to the diamond seed and precipitates or grows on the seed as diamond. This growth occurs preferentially on the re-entrant surfaces 28 as is shown by the dotted lines in FIG. 1. The crystals which are produced thus have a high aspect ratio and may take a plate, tabular, columnar or similar form. The method of the invention can achieve production of such crystals in yields of at least 50 percent and as high as 80% or more.

The invention will now be illustrated by the following examples.

EXAMPLE 1

The reaction capsule as described above was used to produce a plurality of diamond macles. A plurality of twinned diamond seed particles approximately 500 microns in size were oriented in a seed pad with two parallel twin planes perpendicular to the surface of the pad such that growth occurred preferentially on the re-entrant surfaces as is shown in FIG. 1. A cobalt/iron catalyst/solvent system was employed within the reaction capsule. The contents of the capsule were elevated to temperature and pressure conditions of about 55 kilobars and about 1400° C. and these conditions were maintained for a period of 45 hours. The resultant crystals were plates or macles of high aspect ratio, e.g. they had the dimensions were approximately 1mm× 2mm×2mm.

EXAMPLE 2

The reaction capsule as described above was used to produce a plurality of diamond macles. Nineteen (19) twinned diamond seed particles, approximately 500 microns in size, were oriented in a seed pad with two parallel made twin planes perpendicular to the surface of the pad such that growth occurred preferentially on the re-entrant surfaces as shown in FIG. 1. A cobalt/iron catalyst/solvent system was employed within the reaction capsule. The contents of the capsule were elevated to temperature and pressure conditions of about 55 kilobars and about 1380° C. and these conditions were maintained for a period of 45 hours. The resultant crystals were plates or macles of high aspect ratio, e.g. their dimensions were approximately 1mm×1,5mm×2, 5mm. All nineteen seeds produced twinned crystals.

EXAMPLE 3

Another nineteen diamond seed particles, in the size range 420 to 500 microns, were placed on the seed pad. Seven seeds were twinned and were oriented as in the first example. The other twelve seeds were single crystals, six of these were oriented with their (100) crystallographic direction perpendicular to the surface of the seed pad and the other six were oriented with their (111) crystallographic direction perpendicular to the surface of the seed pad. The contents of the reaction capsule were exposed to elevated temperature and pressure conditions, as in Example 2, except that the temperature was raised to 1420° C. Diamond growth occurred on eighteen of the nineteen seeds. The diamond growth on the twinned seeds produced plates or macles, with an approximate size 1,5mm×2,5mm×2,5mm. The diamond growth on the single crystal seeds was of regular morphology and was not twinned, nor did the resultant diamonds have a high aspect ratio.

In the embodiments described above and illustrated in the drawings, the diamond seeds are positioned on the seed pad with the twin planes perpendicular to the upper surface 16a of the pad 16. Other orientations of the diamond seed are possible provided re-entrant surfaces are presented to the metallic catalyst/solvent mass allowing preferential diamond growth to occur thereon.

We claim:

1. A method of producing diamond crystal growth on a seed crystal includes the steps of providing a seed crystal containing at least one twin plane and re-entrant growth surfaces associated therewith and applying high temperature/high pressure synthesis conditions to the seed crystal to cause diamond growth to occur preferentially on the re-entrant surfaces.

2. A method according to claim 1 wherein the seed crystal contains two or more twin planes, each of which have re-entrant growth surfaces associated therewith.

3. A method according to claim 1 wherein the twin crystals are coherent.

4. A method according to claim 1 wherein the seed crystals are diamond seed crystals.

5. A method according to claim 1 wherein the diamond growth on the seed crystal results in a diamond crystal being produced having an aspect ratio of greater than 1.

6. A method according to claim 5 wherein the diamond crystal produced has a shape selected from plate, tabular, columnar and needle.

7. A method of producing one or more diamond crystals, each having an aspect ratio greater than 1, including the steps of:

provididing one or more twinned diamond seed crystals, each of which presents re-entrant growth surfaces;

placing the seed crystals on a pad in a reaction capsule such that the re-entrant surfaces are in contact with a mass of catalyst solvent which separates the crystals from a carbon source;

placing the reaction capsule in the reaction zone of a high temperature/high pressure apparatus;

subjecting the contents of the reaction capsule to conditions of temperature and pressure in the region of diamond thermodynamic stability of the carbon phase diagram such that a temperature gradient is created between the seed crystals and the carbon source with the seed crystals being located at a point near the minimum value of temperature for the gradient and the carbon source being located at a point near the maximum value of temperature for the temperature gradient; and maintaining these conditions for a time sufficient to produce diamond growth on the seed crystals, such diamond growth occurring preferentially on the re-entrant surfaces.

8. A method according to claim 7 wherein at least two twinned diamond crystals are placed on the pad in the reaction capsule.

9. A method according to claim 7 wherein the diamond seed crystal or crystals are placed on the pad such that the twin plane or planes are perpendicular, or substantially perpendicular, to the surface of the pad on which they are placed.

10. A method according to claim 7 wherein at least some of the diamond seed crystals have at least two twin planes.

11. A method according to claim 10 wherein the two or more twin planes of the crystals are coherently twinned.

12. A method according to claim 7 wherein the diamond crystals which are produced each have an aspect ratio in the range 2:1 to 10:1.

13. A method according to claim 7 wherein at least 50 percent of the diamond crystals produced have an aspect ratio of greater than 1.

14. A method according to claim 7 wherein the diamond crystals produced have a shape selected from plate, tabular, columnar and needle.

15. A method according to claim 7 wherein the metal catalyst/solvent is selected from iron, nickel, cobalt and alloys thereof.

16. A method according to claim 7 wherein the metallic catalyst/solvent is an iron/nickel or cobalt/iron alloy.

* * * * *